J. VOLLMER.
COMPOSITE GUN BARREL ASSEMBLED BY ROTARY MOTION OF ITS COMPONENT PARTS.
APPLICATION FILED NOV. 19, 1920.
1,400,780.   Patented Dec. 20, 1921.
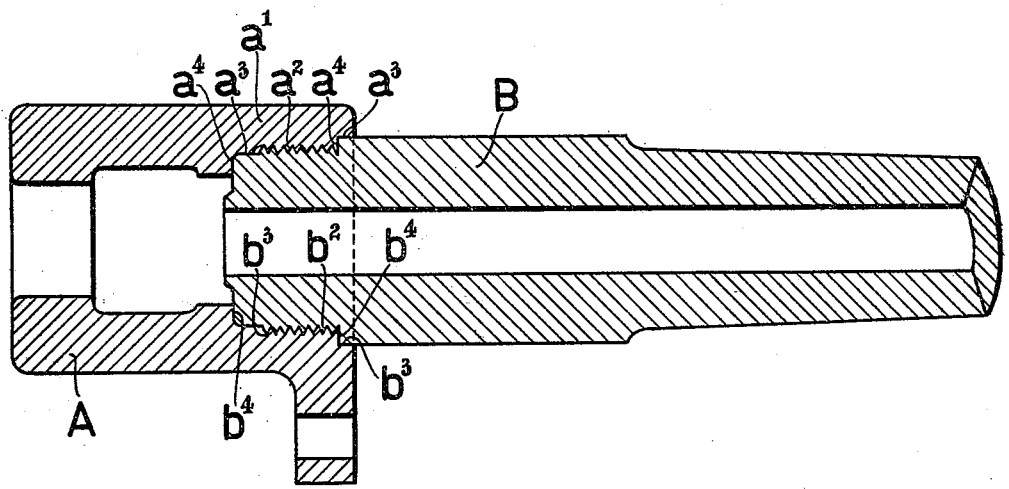
Inventor
John Vollmer
By Knight Bros
Attys

UNITED STATES PATENT OFFICE.

JOHN VOLLMER, OF ESSEN, GERMANY, ASSIGNOR TO FRIED. KRUPP AKTIENGESELL-SCHAFT, OF ESSEN-ON-THE-RUHR, GERMANY.

COMPOSITE GUN-BARREL ASSEMBLED BY ROTARY MOTION OF ITS COMPONENT PARTS.

1,400,780.         Specification of Letters Patent.     Patented Dec. 20, 1921.

Application filed November 19, 1920. Serial No. 425,107.

*To all whom it may concern:*

Be it known that I, JOHN VOLLMER, residing at Essen, Germany, a citizen of the German Republic, have invented a certain new and useful Improvement in Composite Gun-Barrels Assembled by Rotary Motion of its Component Parts, (for which I have filed application in Germany, filed June 16, 1916), of which the following is a specification.

This invention relates to composite gun-barrels the component parts of which are assembled by rotary motion. The connection between the parts of the gun-barrel (for instance between the A-tube and the breech-piece) can be obtained, by various means, for instance, by means of a screw thread or a bayonet joint. The object of the invention is to provide an arrangement which will prevent the bearing surfaces of the assembled parts being injured by what is termed "gripping" or "seizure," as such injuries would render the assembling and taking apart of the gun-barrel difficult, if not entirely impossible. Injury of the nature in question is particularly apt to occur when the parts of the gun-barrel are made of nickel steel.

The drawing shows a longitudinal section of a gun-barrel consisting of an A-tube and a breech-piece screwed on it.

The breech-piece A is formed with a very short jacket portion $a^1$ which envelops the rear portion of the A-tube B. Both parts of the gun-barrel are provided with a screw thread $a^2$ $b^2$, cylindrical bearing surfaces $a^3$ $b^3$, and plane surfaces $a^4$ $b^4$ forming stops. To prevent "gripping" of the screw thread $a^2$ $b^2$ and the surfaces $a^3$ $a^4$ $b^3$ $b^4$ in assembling the gun-barrel and taking it apart, a thin coating of copper or a similar material is provided either on the interior surface of the breech-piece, so far as it comes into contact with the A-tube, or else on the corresponding outer surface of the A-tube; this coating can be applied by electrolytic or chemical action, or by welding. If the metal or alloys used for the coating, copper, for instance, has a higher coefficient of expansion by heat than steel has, it is advisable to apply the coating to the breech-piece only, as, if applied to the A-tube, the coating would tend to detach itself when the gun-barrel becomes very hot.

The coating for the prevention of "gripping" of the bearing surfaces is of special importance in composite gun-barrels which possess a very short breech-piece, in order that the breech-piece in case the A-tube should be destroyed by a shell bursting in the bore, may be used again. For in gun-barrels of this kind the connection between its parts must be a very intimate one.

Claims:

1. A composite gun barrel assembled by rotary motion of its component parts, characterized by the fact that at least one of the two parts to be assembled is coated on its bearing surfaces with a thin coating of metal.

2. A composite gun barrel assembled by rotary motion of its component parts, characterized by the fact that one of the two parts to be assembled is provided on its bearing surfaces with a thin coating of copper.

3. A composite gun barrel assembled by rotary motion of its component parts characterized by the fact that one of the two parts to be assembled is electrolytically coated on its bearing surfaces with a metal coating.

The foregoing specification signed at Essen, Germany, this 24th day of June, 1920.

JOHN VOLLMER.

In presence of—
  HANS GOTTSMANN,
  JOHANN DECKERS.